United States Patent
Takeshita et al.

(10) Patent No.: US 8,008,831 B2
(45) Date of Patent: Aug. 30, 2011

(54) STATOR FOR ROTARY ELECTRIC MACHINE

(75) Inventors: Ikuo Takeshita, Nagano (JP); Shigenori Miyairi, Nagano (JP)

(73) Assignee: Sanyo Denki Co., Ltd., Tokyo (JP)

(*) Notice: Subject to any disclaimer, the term of this patent is extended or adjusted under 35 U.S.C. 154(b) by 0 days.

(21) Appl. No.: 13/042,836

(22) Filed: Mar. 8, 2011

(65) Prior Publication Data
US 2011/0156525 A1 Jun. 30, 2011

Related U.S. Application Data

(62) Division of application No. 12/470,073, filed on May 21, 2009, now Pat. No. 7,919,896.

(30) Foreign Application Priority Data

May 21, 2008 (JP) .................................. 2008-133602

(51) Int. Cl.
*H02K 3/48* (2006.01)
(52) U.S. Cl. ........................................ 310/214; 310/215
(58) Field of Classification Search .................. 310/214, 310/215, 216.105, 216.125
See application file for complete search history.

(56) References Cited

U.S. PATENT DOCUMENTS

| | | | |
|---|---|---|---|
| 4,217,690 A | | 8/1980 | Morreale |
| 4,409,502 A * | | 10/1983 | McCabria ........................ 310/61 |
| 4,467,229 A * | | 8/1984 | Ogita ........................ 310/60 A |
| 4,761,581 A | | 8/1988 | Watanabe et al. |
| 5,763,978 A | | 6/1998 | Uchida et al. |
| 6,008,563 A | | 12/1999 | Baba et al. |
| 6,335,582 B1 * | | 1/2002 | Abukawa et al. ............. 310/214 |
| 6,580,193 B2 | | 6/2003 | Yoshikawa et al. |
| 6,713,927 B2 | | 3/2004 | Kikuchi et al. |
| 2006/0138893 A1 | | 6/2006 | Noda et al. |
| 2009/0289520 A1 * | | 11/2009 | Takeshita et al. ............. 310/214 |

FOREIGN PATENT DOCUMENTS

JP 2004-112861 4/2004

* cited by examiner

*Primary Examiner* — Nguyen N Hanh
(74) *Attorney, Agent, or Firm* — Rankin, Hill & Clark LLP

(57) ABSTRACT

A stator for a rotary electric machine with wedge members insertable into slots without being bent or folded is provided. A coupling portion is integrally formed at a non-inserted end portion, which is not inserted into a slot, of a wedge member, the coupling portion extending across an end of a partition wall portion and an end of a block portion. The wedge member and the coupling portion are formed of a synthetic resin material. Two or more coupling portions of two or more adjacently disposed wedge members are integrally formed as a continuous coupling portion.

1 Claim, 6 Drawing Sheets

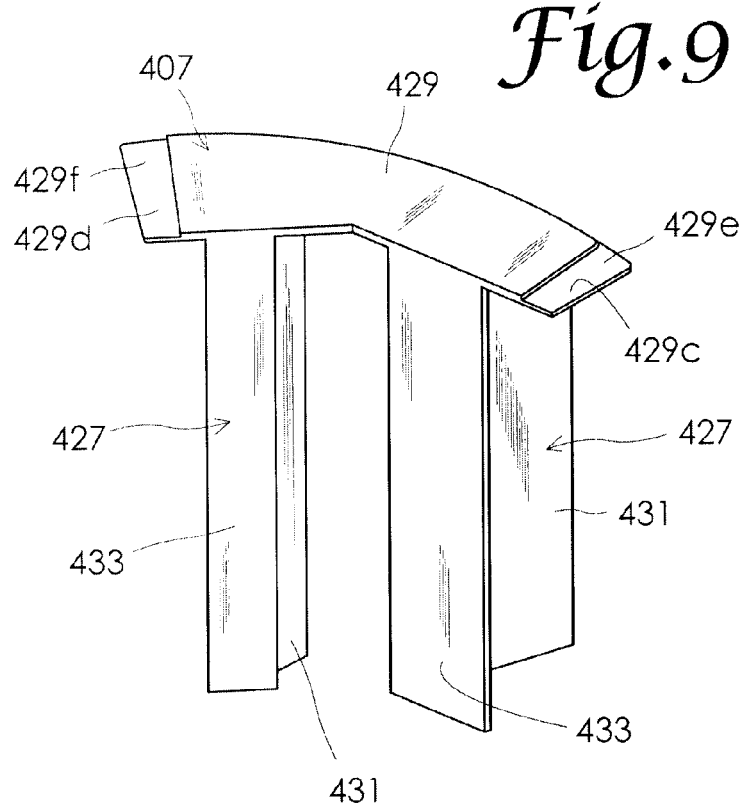
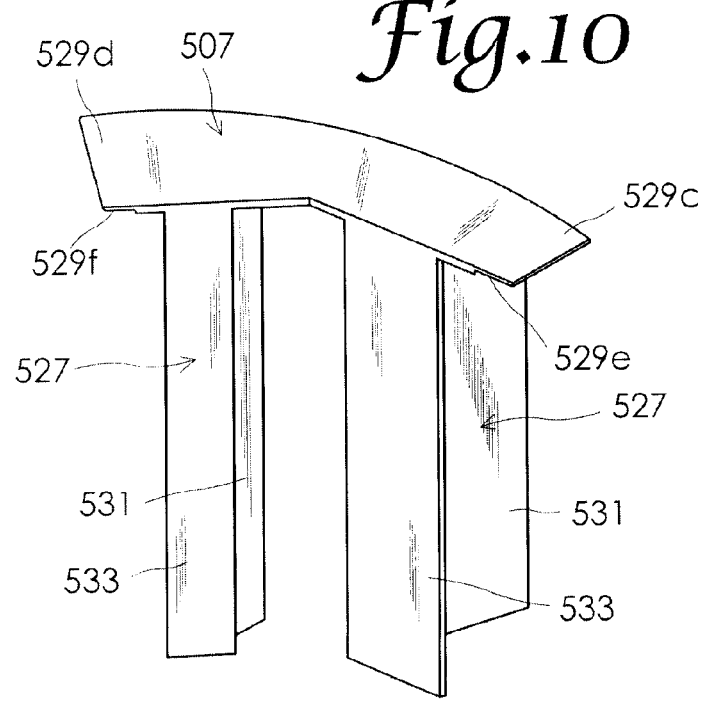

STATOR FOR ROTARY ELECTRIC MACHINE

CROSS-REFERENCE TO RELATED APPLICATION

The present application is a division of application Ser. No. 12/470,073 filed May 21, 2009, which issued as U.S. Pat. No. 7,919,896 on Apr. 5, 2011.

BACKGROUND OF THE INVENTION

1. Field of the Invention

The present invention relates to a stator for use in a rotary electric machine such as a motor.

2. Description of the Related Art

In general, a stator for a rotary electric machine includes a stator core, a slot insulator made of a synthetic resin and fitted to the stator core, and a plurality of winding portions. The stator core for a rotary electric machine includes an annular yoke and a plurality of magnetic pole portions disposed radially inwardly of the yoke at intervals in a circumferential direction of the yoke. The magnetic pole portions each have a pole column with an outer end portion connected to an inner periphery of the yoke and a magnetic pole surface forming portion provided at an inner end portion of the pole column and including a magnetic pole surface facing a rotor of the rotary electric machine. The winding portions are formed by concentratedly winding a winding conductor around the pole columns of the magnetic pole portions via the slot insulator. In the conventional stator for a rotary electric machine, the magnetic pole portions are individually wrapped in insulating paper to ensure insulation between adjacent magnetic pole portions and insulation between the magnetic pole portions and other members. If the magnetic pole portions are individually wrapped in insulating paper, however, production of the stator for a rotary electric machine may become complex. With this in view, Japanese Patent Application Publication No. 2004-112861 (JP2004-112861A) has proposed the use of wedge members formed of an electrically insulating material and disposed between two adjacent magnetic pole portions. The conventional wedge members are formed by folding a synthetic-resin sheet and each include a partition wall portion inserted into a slot and a block portion for blocking an opening portion of the slot facing the rotor.

SUMMARY OF THE INVENTION

In the conventional stator for a rotary electric machine, however, the wedge members may be bent or folded when they are inserted into the slots one by one.

An object of the present invention is to provide a stator for a rotary electric machine with wedge members easily insertable into slots without being bent or folded.

Another object of the present invention is to provide a stator for a rotary electric machine for which inserting wedge members into slots can be facilitated.

Still another object of the present invention is to provide a stator for a rotary electric machine with wedge members that can securely be held in slots.

A stator for a rotary electric machine of which improvements are aimed at by the present invention includes a stator core, a slot insulator, a plurality of winding portions, and a plurality of wedge members. The stator core includes an annular yoke and a plurality of magnetic pole portions disposed radially inwardly of the yoke at intervals in a circumferential direction of the yoke. The magnetic pole portions each have a pole column with an outer end portion connected to an inner periphery of the yoke and a magnetic pole surface forming portion provided at an inner end portion of the pole column and including a magnetic pole surface facing a rotor. The slot insulator is fitted to the stator core to prevent a winding conductor to be wound around the pole columns of the magnetic pole portions from directly contacting the stator core. The slot insulator is made of a synthetic resin. The winding portions are formed by concentratedly winding the winding conductor around the pole columns of the magnetic pole portions via the slot insulator. The wedge members each include a partition wall portion and a block portion. The partition wall portion is inserted into a slot formed between two adjacent magnetic pole portions to electrically insulate the two adjacent magnetic pole portions. The block portion is integrally formed with the partition wall portion to block an opening portion of the slot facing the rotor. In the present invention, a coupling portion is formed at a non-inserted end portion, which is not inserted into the slot, of the wedge member, the coupling portion extending across an end of the partition wall portion and an end of the block portion. The wedge member and the coupling portion are integrally formed of a synthetic resin material.

Since the coupling portion is integrally formed with the wedge member in the present invention, the coupling portion reinforces the wedge member to enhance the strength of the wedge member. As a result, the wedge members can be prevented from being bent or folded when they are inserted into the slots as in the related art. The wedge members may be inserted into the slots by applying a pressing force to the coupling portions, facilitating insertion of the wedge members into the slots. The coupling portions may ensure electric insulation between the winding portions and other members (for example, a circuit substrate).

Two or more coupling portions of two or more adjacently disposed wedge members may be integrally formed as a continuous coupling portion. Since two or more wedge members are coupled by a continuous coupling portion, the two or more wedge members may be inserted into two or more slots at the same time, eliminating the need to insert the wedge members into the slots one by one. As a result, inserting the wedge members into the slots may be facilitated.

Both end portions of each continuous coupling portion in the circumferential direction may be shaped to overlap one end of an adjacent continuous coupling portion to form an overlapping portion having the same thickness as an intermediate portion of the continuous coupling portion located between the both end portions. With this configuration, two adjacent end portions of two adjacent continuous coupling portions overlap each other so that a plurality of continuous coupling portions finally form an annular wall portion. The annular wall portion is located at ends of the winding portions on one side in an axial direction of the rotor to cover the ends of the winding portions on the one side. This reliably ensures electric insulation between the winding portions and a circuit substrate, for example, disposed outside the annular wall portion.

If one coupling portion is integrally formed with one wedge member, preferably, both end portions of the one coupling portion in the circumferential direction are shaped to overlap one end of an adjacent coupling portion to form an overlapping portion having the same thickness as an intermediate portion of the coupling portion located between the both end portions.

The both end portions of each continuous coupling portion or each coupling portion may be shaped to be symmetric by 180° with respect to a symmetry center. With this configuration, the continuous coupling portions or the coupling portions to be disposed in the same stator core may have the same shape. Thus, it is not necessary to prepare more than one type of wedge structural units in each of which two or more partition wall portions and block portions of two or more wedge members are coupled to one continuous coupling portion, or in each of which a partition wall portion and a block portion of one wedge member are coupled to a coupling portion.

Non-inserted end portions of all the wedge members may be integrally coupled to form one annular continuous coupling portion. That is, a wedge structural unit of an integral structure in which the partition wall portions and the block portions of all the wedge members are coupled to one annular continuous coupling portion may be used. With this configuration, all the wedge members may be inserted into all the slots at one time. In this case, preferably, the annular continuous coupling portion is formed to extend across an end of the partition wall portion and an end of the block portion of each wedge member. This configuration advantageously facilitates integral molding of the annular continuous coupling portion and the wedge members, and increases the mechanical strength of the wedge structural unit.

Preferably, a pair of gaps are formed between the magnetic pole surface forming portion of each magnetic pole portion and an opposed portion of the slot insulator that faces the magnetic pole surface forming portion, one of the gaps communicates with the slot formed adjacent to the magnetic pole portion on one side in the circumferential direction and the other one of the gaps communicates with the slot formed adjacent to the magnetic pole portion on the other side in the circumferential direction, and an end portion of the block portion of each wedge member inserted into the slot is fitted into the gap adjacent to the end portion of the block portion. Preferably, the slot insulator is formed with a groove for receiving a free end of the partition wall portion of each wedge member. With this configuration, the block portion and the partition wall portion of each wedge member are supported by the slot insulator, allowing the wedge members to be securely held in the slots.

A stator for a rotary electric machine according to the present invention may not necessarily include a continuous coupling portion or a coupling portion. In this configuration, the plurality of wedge members may be integrally formed of a synthetic resin material, a pair of gaps may be formed between the magnetic pole surface forming portion of each magnetic pole portion and an opposed portion of the slot insulator that faces the magnetic pole surface forming portion; one of the gaps may communicate with the slot formed adjacent to the magnetic pole portion on one side in the circumferential direction and the other one of the gaps may communicate with the slot formed adjacent to the magnetic pole portion on the other side in the circumferential direction, and an end portion of the block portion of each wedge member inserted into the slot may be fitted into the gap adjacent to the end portion of the block portion. Also in this configuration, the wedge members may be prevented from being bent or folded when they are inserted into the slots, and the wedge members may securely be held in position in the slots.

The slot insulator may be formed with a plurality of grooves for receiving free ends of the partition wall portions of the plurality of wedge members. In this way, the wedge members may further be securely held in position in the slots.

Since the coupling portion is integrally formed with the wedge member in the present invention, the coupling portion reinforces the wedge member to enhance the rigidity and strength of the wedge member. Thus, the wedge members may be prevented from being bent or folded when they are inserted into the slots as in the related art. Moreover, inserting the wedge members into the slots may be facilitated by the use of the coupling portion.

BRIEF DESCRIPTION OF THE DRAWINGS

FIG. 9 is a perspective view of a wedge member for use in a stator for a rotary electric machine according to further another embodiment of the present invention.

FIG. 10 is a perspective view of a wedge member for use in the stator for a rotary electric machine according to the further another embodiment of the present invention.

DESCRIPTION OF THE PREFERRED EMBODIMENTS

Figure 1:
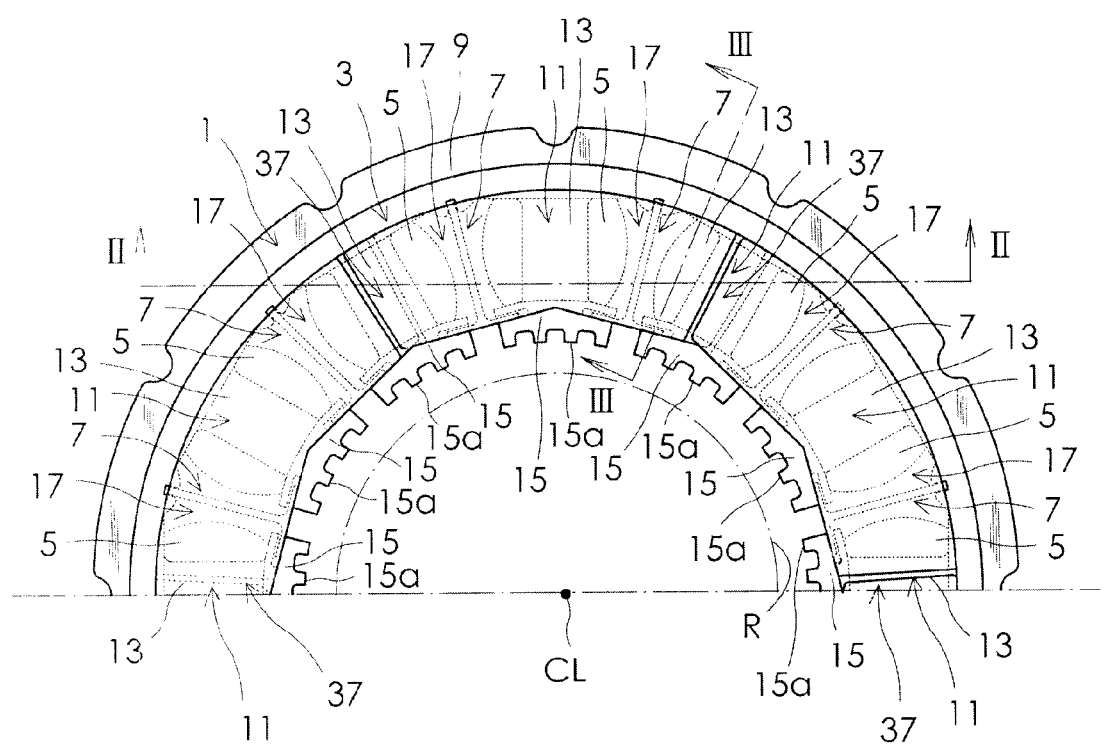
FIG. 1 is a plan view of a part of a stator for a rotary electric machine according to an embodiment of the present invention.
Figure 2:
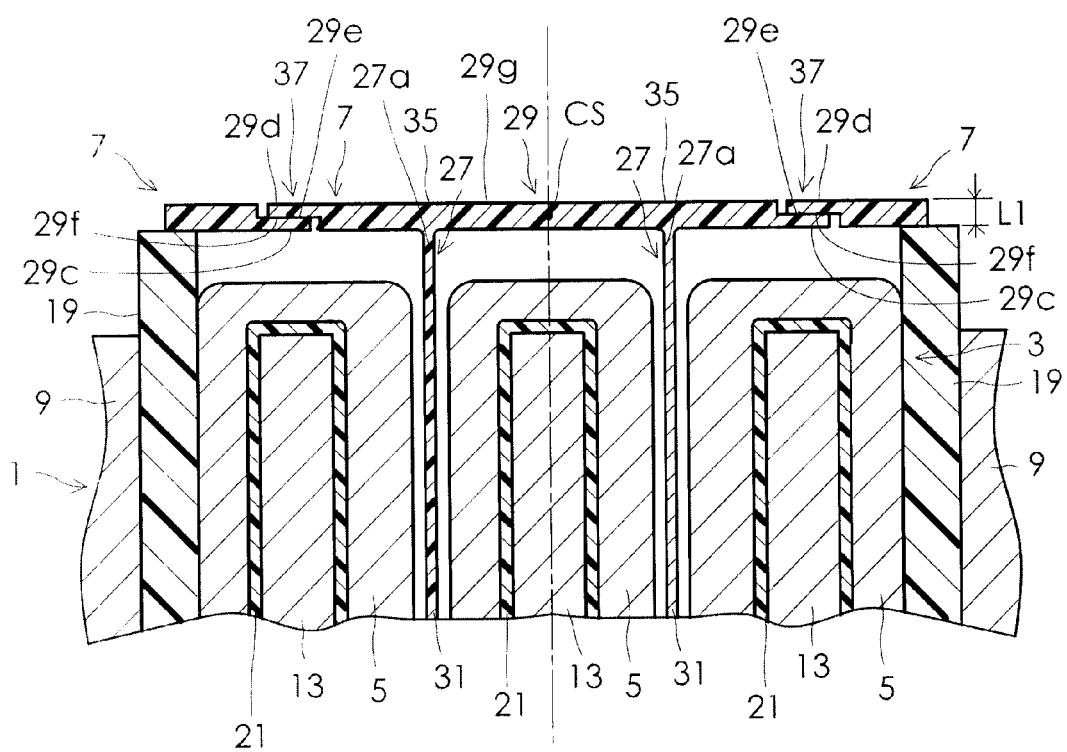
FIG. 2 is a cross-sectional view taken along line II-II of FIG. 1.
Figure 3:
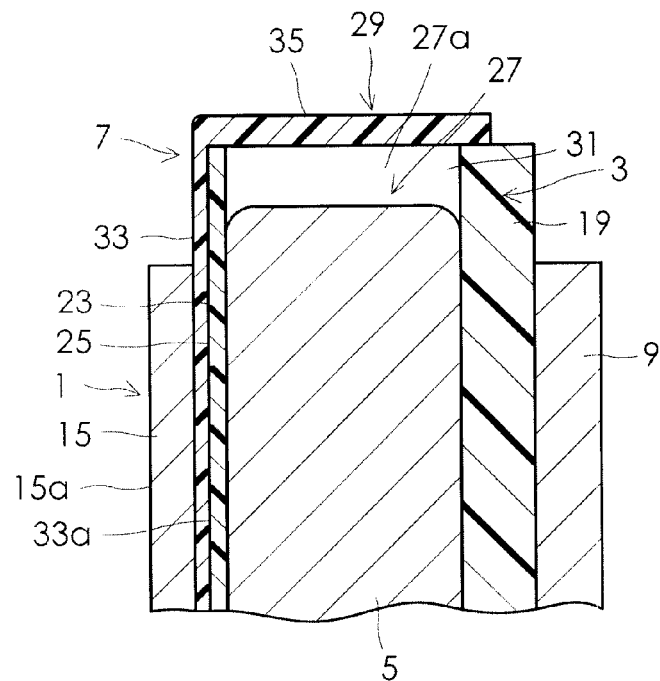
FIG. 3 is a cross-sectional view taken along line of FIG. 1.
Figure 4:
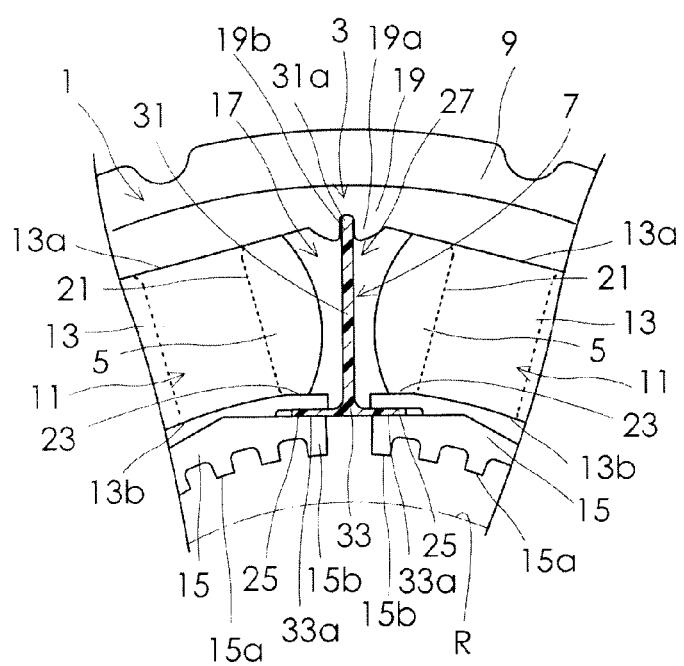
FIG. 4 is a partial enlarged view of FIG. 1 with a continuous coupling portion of a wedge structural unit not illustrated.

Hereinafter, a stator for a rotary electric machine according to an embodiment of the present invention will be described in detail with reference to the drawings. FIG. 1 is a plan view of a part of a stator for a rotary electric machine according to this embodiment. FIG. 2 is a cross-sectional view taken along line II-II of FIG. 1. FIG. 3 is a cross-sectional view taken along line of FIG. 1. FIG. 4 is a partial enlarged view of FIG. 1. For ease of understanding, a continuous coupling portion 29 of a wedge structural unit 7 to be discussed later is not illustrated in FIG. 4. As shown in the figures, the stator for a rotary electric machine according to this embodiment includes a stator core 1, a slot insulator 3, a plurality of winding portions 5, and a plurality of wedge structural units 7. The stator core 1 includes an annular yoke 9 and a plurality of magnetic pole portions 11 disposed radially inwardly of the yoke 9 at intervals in the circumferential direction of the yoke 9. In the description below, the term "circumferential direction" denotes the circumferential direction of the yoke 9 mounted on the stator core 1. The term "center line of the yoke" denotes an imaginary line corresponding to an axis (CL) of a rotary shaft (not shown) of a rotor R received inside the stator core 1. The term "radial direction of the yoke" denotes the direction of a line extending radially from the center axis of the yoke. As shown in FIG. 4, the magnetic pole portions 11 each have a pole column 13 with an outer end portion 13a connected to an inner periphery of the yoke 9 and a magnetic pole surface forming portion 15 provided at an inner end portion 13b of the pole column 13 and including a magnetic pole surface 15a facing the rotor R shown by the broken line. Both end portions 15b of each magnetic pole surface forming portion 15 in the circumferential direction of the yoke 9 project from the pole column 13 in the circumferential direction. A slot 17 is formed between two adjacent magnetic pole portions 11.

The slot insulator 3 is made of a synthetic resin and fitted to the stator core 1 to prevent a winding conductor of the winding portions 5 from directly contacting the stator core 1. In this embodiment, the slot insulator 3 is composed of two separate parts. The two separate parts are assembled by fitting them to the stator core 1 from both sides of the stator core 1 along the center line CL of the yoke 9. The slot insulator 3 has integrated therewith a yoke covering portion 19 for covering a part of the yoke 9, a plurality of pole column covering portions 21 connected to the yoke covering portion 19 to cover the pole columns 13 and a plurality of opposed portions 23 that are connected to the pole column covering portions 21 and that face the magnetic pole surface forming portions 15. A projection 19a is formed at a portion of the yoke covering portion 19 that faces each slot 17. The projection 19a projects inwardly of the slot 17. A groove 19b is formed in the center of each projection 19a. The groove 19b opens at both ends in the direction of the center line CL of the yoke 9, and also opens inwardly of the slot 17. A pair of gaps 25 are formed between the both end portions 15b of each magnetic pole surface forming portion 15 and the opposed portion 23. The winding portions 5 are formed by concentratedly winding a winding conductor around the pole columns 13 of the magnetic pole portions 11 via the pole column covering portions 21 of the slot insulator 3.

Figure 5:
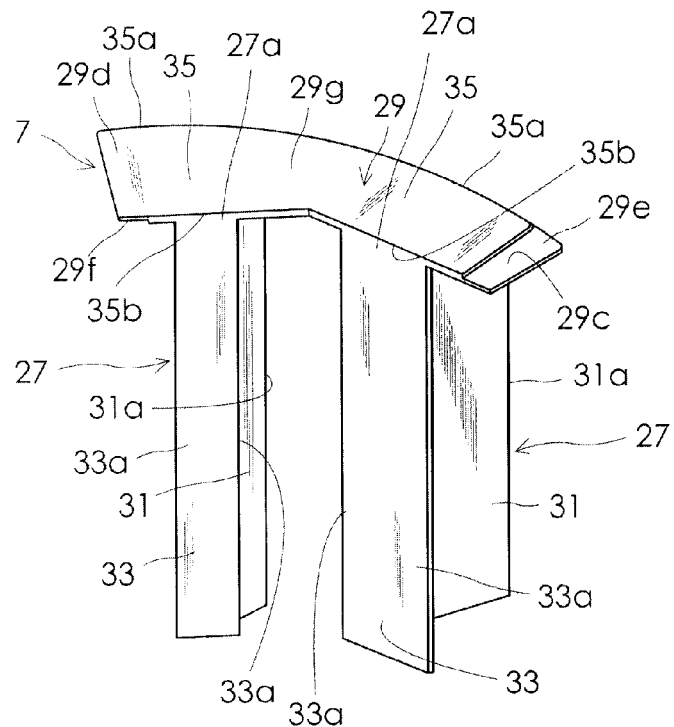
FIG. 5 is a perspective view of the wedge structural unit for use in the stator for a rotary electric machine shown in FIG. 1.

The wedge structural units 7 are integrally formed of a synthetic resin such as a nylon or polybutylene terephthalate (PBT) by injection molding. As shown in FIG. 5, one wedge structural unit 7 has two wedge members 27 and a continuous coupling portion 29 coupling the two wedge members 27. The wedge members 27 each have a partition wall portion 31 and a block portion 33. The partition wall portion 31 is in the shape of a rectangular flat plate, and is inserted into the slot 17 to electrically insulate the two adjacent winding portions 5. As shown in FIG. 4, a free end 31a of the partition wall portion 31 is inserted into the groove 19b of the yoke covering portion 19 of the slot insulator 3. Every slot 17 receives the partition wall portion 31 of the wedge member 27. Therefore, if each wedge structural unit 7 includes two wedge members 27 as in this embodiment, the number of the wedge structural units 7 is half the number of the slots 17. For example, if the stator is provided with 12 slots, the number of wedge structural units 7 is 6.

The block portion 33 is in the shape of a rectangular flat plate, and blocks an opening portion of the slot 17 facing the rotor R. An end of the partition wall portion 31 opposite the free end 31a is connected to the center portion of the block portion 33. Thus, the cross section of the wedge member 27 taken in the direction perpendicular to the center line CL is in the shape of a letter T. An end portion 33a of the block portion inserted into the slot, located in the circumferential direction, is fitted into the gap 25 adjacent to the end portion of the block portion. Thus, the wedge members 27 are securely held in the slots 17.

As shown in FIG. 5, the continuous coupling portion 29 is integrally formed of two coupling portions 35 in the shape of a flat plate. One coupling portion 35 is formed at a non-inserted end portion 27a, which is not inserted into the slot 17, of the wedge member 27 to extend across an end of the partition wall portion 31 and an end of the block portion 33 (see FIGS. 2 and 3). The coupling portions 35 each have first and second end faces 35a, 35b at both ends in the radial direction of the yoke 9. The first end face 35a extends arcuately in the circumferential direction of the yoke 9. The second end face 35b extends in flush with a surface of the block portion 33 that faces the rotor R. The continuous coupling portion 29 includes stepped portions 29e, 29f at a pair of end portions 29c, 29d, respectively, located in the circumferential direction of the yoke 9. The pair of end portions 29c, 29d are thinner (smaller in the direction of the center line CL) than the remaining portions. One end portion 29c is shaped such that the stepped portion 29e is located on one side in the direction of the center line CL of the yoke 9 (on the upper side in FIG. 5). The other end portion 29d is shaped such that the stepped portion 29f is located on the other side in the direction of the center line CL of the yoke 9 (on the lower side in FIG. 5). Consequently, both the end portions 29c, 29d are shaped to be symmetric by 180° with respect to a symmetry center CS as shown in FIG. 2.

As shown in FIG. 2, with the wedge structural units 7 attached to the stator core 1, the one end portion 29c of a continuous coupling portion 29 overlaps the other end portion 29d of an adjacent continuous coupling portion 29 to form an overlapping portion 37. Likewise, the other end portion 29d of the continuous coupling portion 29 overlaps the one end portion 29c of an adjacent continuous coupling portion 29 to form an overlapping portion 37. The overlapping portions 37 thus formed have the same thickness L1 as the thickness of an intermediate portion 29g located between both the end portions of the continuous coupling portion 29. Two adjacent end portions 29c, 29d of every two adjacent continuous coupling portions 29 of the wedge structural units 7 overlap each other in this way so that the continuous coupling portions 29 form an annular wall portion.

The wedge structural units 7 according to this embodiment may be placed in the stator core 1 as follows. First, a plurality of wedge structural units 7 are assembled using a jig such that two adjacent end portions 29c, 29d of every two adjacent continuous coupling portions 29 of the wedge structural units 7 overlap each other to form one annular wall portion. Now, the wedge structural units 7 are placed to face the stator core 1 such that the free ends 31a of the partition wall portions 31 of the wedge members 27 may be inserted into the grooves 19b provided in the slots 17 of the slot insulator 3 and both the end portions 33a of the block portions 33 of the wedge members 27 may be inserted into the pairs of gaps 25 at the same time. Then, the wedge members 27 are inserted into the slots 17 by applying a pressing force in the direction of the stator core 1 to the continuous coupling portions 29. The wedge structural units 7 may be mounted manually or automatically using an appropriate mounting jig.

According the stator for a rotary electric machine of this embodiment, each wedge structural unit 7 includes a continuous coupling portion 29 composed of two coupling portions 35 integrated together. The existence of the continuous coupling portion 29 increases the strength of the wedge members 27. As a result, the wedge members may be prevented from being bent or folded when they are inserted into the slots as in the related art. Since two wedge members 27 are coupled by the continuous coupling portion 29, there is no need to insert the wedge members 27 into the slots 17 one by one, facilitating insertion of the wedge members 27 into the slots 17. Since both the end portions 29c, 29d of the continuous coupling portion 29 are shaped to be symmetric by 180° with respect to the symmetry center CS, the continuous coupling portions 29 to be disposed in the same stator core 1 are allowed to have the same shape. Thus, it is not necessary to prepare more than one type of wedge structural units.

Figure 6:
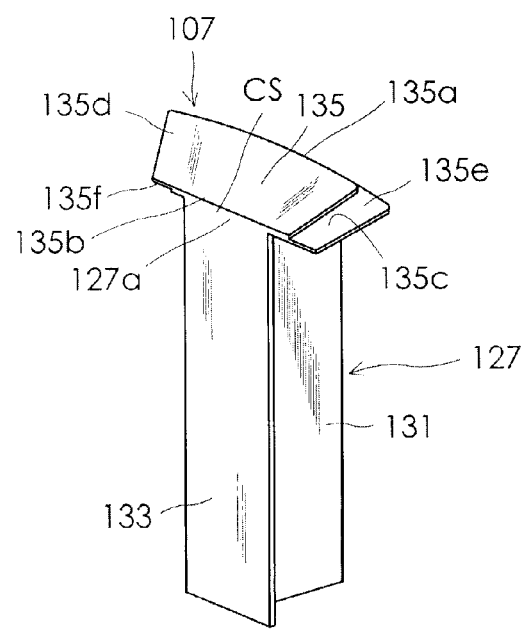
FIG. 6 is a perspective view of a wedge structural unit for use in a stator for a rotary electric machine according to another embodiment of the present invention.

FIG. 6 is a perspective view of a wedge structural unit 107 for use in a stator for a rotary electric machine according to another embodiment of the present invention. In FIG. 6, components similar to the components of the wedge structural unit 7 used in the above embodiment shown in FIGS. 1 to 5 are denoted by reference numerals obtained by adding 100 to the reference numerals affixed to their counterparts in FIGS. 1 to 5 and their descriptions are omitted. The wedge structural unit 107 has one wedge member 127 and one coupling portion 135. As with the wedge structural unit 7 discussed above, the wedge structural unit 107 is also integrally formed of a synthetic resin material by injection molding. As with the wedge member 27 shown in FIG. 5, the wedge member 127 has a partition wall portion 131 and a block portion 133.

The coupling portion 135 is formed at a non-inserted end portion 127a, which is not inserted into the slot 17, of the wedge member 127 to extend across an end of the partition wall portion 131 and an end of the block portion 133. The coupling portion 135 has first and second end faces 135a, 135b at both ends in the radial direction of the yoke 9. The first end face 135a extends arcuately in the circumferential direction of the yoke 9. The second end face 135b extends in flush with a surface of the block portion 133 that faces the rotor R. The coupling portion 135 includes stepped portions 135e, 135f at a pair of end portions 135c, 135d located in the circumferential direction of the yoke 9. The pair of end portions 135c, 135d are thinner (smaller in the direction of the center line CL) than the remaining portions. One end portion 135c is shaped such that the stepped portion 135e is located on one side in the direction of the center line CL of the yoke 9 (on the upper side in FIG. 6). The other end portion 135d is shaped such that the stepped portion 135f is located on the other side in the direction of the center line CL of the yoke 9 (on the lower side in FIG. 6). Consequently, both the end portions 135c, 135d are shaped to be symmetric by 180° with respect to a symmetry center CS. With a plurality of wedge structural units 107 attached to the stator core 1, the one end portion 135c of the coupling portion 135 of a wedge structural unit 107 overlaps the other end portion 135d of the coupling portion 135 of an adjacent wedge structural unit 107 to form an overlapping portion. Likewise, the other end portion 135d of the continuous coupling portion 135 of the wedge structural unit 107 overlaps the one end portion 135c of the coupling portion 135 of an adjacent wedge structural unit 107 to form an overlapping portion. Two adjacent end portions 135c, 135d of every two adjacent coupling portions 135 of the wedge structural units 107 overlap each other in this way so that the coupling portions 135 form an annular wall portion. The wedge members 127 of the wedge structural units 107 according to this embodiment may also be inserted into the slots 17 manually or mechanically as with the wedge members 27 of the wedge structural units 7 of the embodiment discussed above.

Also if the wedge structural units 107 according to this embodiment are used, the wedge members 127 may be prevented from being bent or folded when they are inserted into the slots 17. In addition, the wedge members 127 may be securely held in the slots 17.

Figure 7:
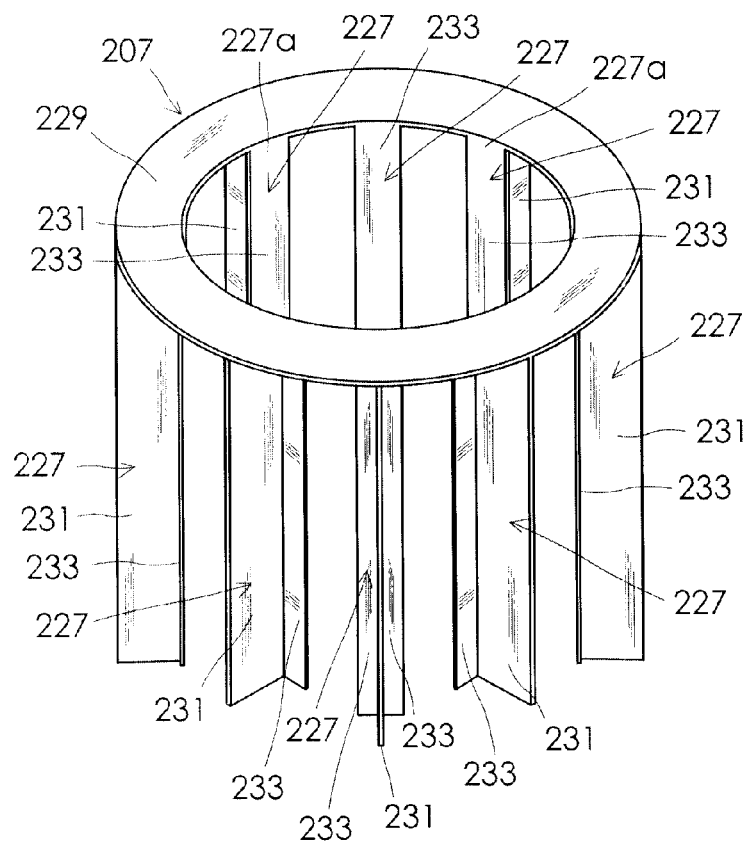
FIG. 7 is a perspective view of a wedge structural unit for use in a stator for a rotary electric machine according to still another embodiment of the present invention.

FIG. 7 is a perspective view of a wedge structural unit 207 for use in a stator for a rotary electric machine according to still another embodiment of the present invention. In FIG. 7, components similar to the components of the wedge structural unit 7 used in the above embodiment shown in FIGS. 1 to 5 are denoted by reference numerals obtained by adding 200 to the reference numerals affixed to their counterparts in FIGS. 1 to 5 and their descriptions are omitted. The wedge structural unit 207 according to this embodiment is also integrally formed of a synthetic resin as with the wedge structural unit 7 shown in FIG. 5. The wedge structural unit 207 has twelve wedge members 227 inserted into twelve corresponding slots 17 and one continuous coupling portion 229 coupling all the twelve wedge members 227. The wedge members 227 have the same structure as the wedge members 27 shown in FIG. 5, that is, have a partition wall portion 231 and a block portion 233. The continuous coupling portion 229 is in the shape of an annular flat plate. Non-inserted end portions 227a of all the twelve wedge members 227, which are inserted into all the slots 17, are coupled to the continuous coupling portion 229. According to the stator for a rotary electric machine of this embodiment, the twelve wedge members 227 may be inserted into the twelve slots 17 in one action.

Figure 8:
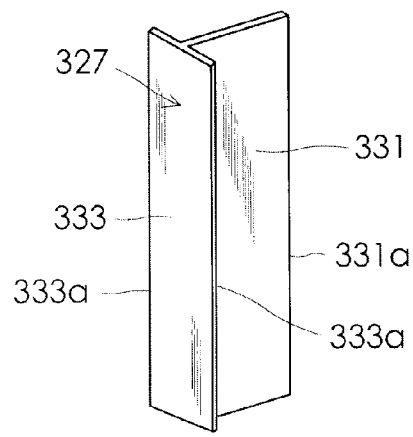
FIG. 8 is a perspective view of a wedge member for use in a stator for a rotary electric machine according to yet another embodiment of the present invention.

In the wedge structural units for use in the stators for a rotary electric machine according to the above embodiments shown in FIGS. 5 to 7, each wedge member is provided with a coupling portion. However, wedge members which are assembled with other wedge structural units when used may be not coupled by means of a coupling portion. In this case, a wedge member 327 having a partition wall portion 331 and a block portion 333 as shown in FIG. 8 is inserted into each slot 17. In FIG. 8, components similar to the components of the wedge structural unit 7 used in the above embodiment shown in FIGS. 1 to 5 are denoted by reference numerals obtained by adding 300 to the reference numerals affixed to their counterparts in FIGS. 1 to 5 and their descriptions are omitted.

Also if the wedge member 327 according to this embodiment is used, a free end 331a of the partition wall portion 331 is inserted into the groove 19b of the yoke covering portion 19 of the slot insulator 3. An end portion 333a of each block portion 333 inserted into the slot 17 is fitted into a gap 25 adjacent to the end portion 333a of the block portion 333. Thus, the wedge members 327 are securely held in the slots 17 (see FIG. 4).

In the wedge structural units or the wedge members for use in the stators for a rotary electric machine according to the above embodiments shown in FIGS. 5 to 8, wedge structural units or wedge members of one type are attached to the stator core. However, a plurality of types of wedge structural units may be combined for attachment to the stator core. FIGS. 9 and 10 are each a perspective view showing each of two types of wedge structural units to be attached to one stator core. In FIG. 9, components similar to the components of the wedge structural unit 7 used in the above embodiment shown in FIGS. 1 to 5 are denoted by reference numerals obtained by adding 400 to the reference numerals affixed to their counterparts in FIGS. 1 to 5 and their descriptions are omitted. In FIG. 10, components similar to the components of the wedge structural unit 7 used in the above embodiment shown in FIGS. 1 to 5 are denoted by reference numerals obtained by adding 500 to the reference numerals affixed to their counterparts in FIGS. 1 to 5 and their descriptions are omitted. The wedge structural unit 407 shown in FIG. 9 has two wedge members 427 and a continuous coupling portion 429 coupling the two wedge members 427 as with the wedge structural unit 7 shown in FIG. 5. The wedge members 427 each have a partition wall portion 431 and a block portion 433. The continuous coupling portion 429 includes stepped portions 429e, 429f at a pair of end portions 429c, 429d located in the circumferential direction. The pair of end portions 429c, 429d are thinner (smaller in the direction of the center line CL) than the remaining portions. One end portion 429c is shaped such that the stepped portion 429e is located on one side in the direction of the center line CL of the yoke 9 (on the upper side in FIG. 9). The other end portion 429d is also shaped such that the stepped portion 429f is located on the one side in the direction of the center line CL of the yoke 9 (on the upper side in FIG. 9).

The wedge structural unit 507 shown in FIG. 10 also has two wedge members 527 and a continuous coupling portion 529 coupling the two wedge members 527 as with the wedge structural unit 7 shown in FIG. 5. The wedge members 527 each have a partition wall portion 531 and a block portion 533. The continuous coupling portion 529 includes stepped portions 529e, 529f at a pair of end portions 529c, 529d, respectively, located in the circumferential direction. The pair of end portions 529c, 529d are thinner (smaller in the direction of the center line CL) than the remaining portions. One end portion 529c is shaped such that the stepped portion 529e is located on the other side in the direction of the center line CL of the yoke 9 (on the lower side in FIG. 10). The other end portion 529d is also shaped such that the stepped portion 529f is located on the other side in the direction of the center line CL of the yoke 9 (on the lower side in FIG. 10).

In the stator for a rotary electric machine according to this embodiment, the wedge structural unit 407 shown in FIG. 9 and the wedge structural unit 507 shown in FIG. 10 are alternately arranged. Thus, with a plurality of wedge structural units 407, 507 attached to the stator core 1, the one end portion 429c of the continuous coupling portion 429 of a wedge structural unit 407 overlaps the other end portion 529d of the continuous coupling portion 529 of an adjacent wedge structural unit 507 to form an overlapping portion. Likewise, the other end portion 429d of the continuous coupling portion 429 of the wedge structural unit 407 overlaps the one end portion 529c of the continuous coupling portion 529 of an adjacent wedge structural unit 507 to form an overlapping portion. The overlapping portions thus formed have the same thickness as the thickness of an intermediate portion located between both the end portions of the continuous coupling portion 429 or 529.

The wedge structural units 407, 507 according to this embodiment may be placed in the stator core 1 as follows. First, the wedge members 427 of a plurality of wedge structural units 407 are inserted into the slots 17 with two slots 17 between every two adjacent wedge structural units 407 left vacant. For example, if a stator core with twelve slots is used, the wedge members 427 of three wedge structural units 407 are inserted into the slots 17 such that two slots 17 between every two adjacent wedge structural units 407 are left vacant.

Then, the wedge members 527 of wedge structural units 507 are inserted into the slots 17 between every two adjacent wedge structural units 407. For example, if the stator core with twelve slots is used, the wedge members 527 of three wedge structural units 507 are inserted into the slots 17 such that two wedge members 527 of each wedge structural unit 507 are inserted into the two slots 17 between every two adjacent wedge structural units 407. The wedge structural units 407, 507 are thus placed in the stator core 1 with both the end portions 429c, 429d of the continuous coupling portion 429 of a wedge structural unit 407 overlapping the other end portion 529d of the continuous coupling portion 529 of an adjacent wedge structural unit 507 and the one end portion 529c of the continuous coupling portion 529 of an adjacent wedge structural unit 507.

According to the stator for a rotary electric machine of this embodiment, the wedge members 427, 527 may be inserted into the slots 17 without the need to overlap the end portions of the coupling portions or the continuous coupling portions before the wedge members are inserted into the slots as if the wedge structural units 7, 107 shown in FIGS. 5 and 6 are used.

Although two coupling portions are coupled by one continuous coupling portion in the above embodiments, any number of coupling portions may be coupled by a continuous coupling portion.

The wedge structural units may be used in various combinations other than the combinations in the above embodiments. For example, the wedge structural unit 7 shown in FIG. 5 and the wedge structural unit 107 shown in FIG. 6 may be combined for use in the same stator for a rotary electric machine.

Although the present invention has been described by way of specific embodiments, the present invention is not limited thereto. Rather, it should be understood by those skilled in the art that the present invention may be modified and changed in various ways without departing from the scope and spirit of the present invention.

What is claimed is:

1. A stator for a rotary electric machine comprising:
   a stator core comprising an annular yoke and a plurality of magnetic pole portions disposed radially inwardly of the yoke at intervals in a circumferential direction of the yoke, the magnetic pole portions each having a pole column with an outer end portion connected to an inner periphery of the yoke and a magnetic pole surface forming portion provided at an inner end portion of the pole column and including a magnetic pole surface facing a rotor;
   a slot insulator made of a synthetic resin and fitted to the stator core to prevent a winding conductor to be wound around the pole columns of the magnetic pole portions from directly contacting the stator core;
   a plurality of winding portions formed by concentratedly winding the winding conductor around the pole columns of the magnetic pole portions via the slot insulator; and
   a plurality of wedge members each comprising a partition wall portion inserted into a slot formed between two adjacent magnetic pole portions to electrically insulate the two adjacent magnetic pole portions, and a block portion integrally formed with the partition wall portion to block an opening portion of the slot facing the rotor, wherein
   a coupling portion is formed at a non-inserted end portion, which is not inserted into the slot, of the wedge member, the coupling portion extending across an end of the partition wall portion and an end of the block portion; and
   the wedge member and the coupling portion are integrally formed of a synthetic resin material;
   wherein one or more first wedge structural units are constructed such that two or more coupling portions of two or more adjacently disposed wedge members are integrally formed as a continuous coupling portion, both end portions of each continuous coupling portion in the circumferential direction having a same shape;
   one or more second wedge structural units are constructed such that two or more coupling portions of two or more adjacently disposed wedge members are integrally formed as a continuous coupling portion, both end portions of each continuous coupling portion in the circumferential direction having a same shape; and,
   the shape of the both end portions of the continuous coupling portion of the first wedge structural unit and the shape of the both end portions of the continuous coupling portion of the second wedge structural unit are defined to overlap one end of the adjacent continuous coupling portion to form an overlapping portion having the same thickness as an intermediate portion of the continuous coupling portion.

* * * * *